Sept. 8, 1964   L. B. LYNN   3,148,006
ELECTRIC MOTOR BEARING LUBRICATION SYSTEM
Filed Aug. 31, 1962   3 Sheets-Sheet 1

Fig. I.

_United States Patent Office_

3,148,006
Patented Sept. 8, 1964

3,148,006
ELECTRIC MOTOR BEARING LUBRICATION SYSTEM
Lawrence B. Lynn, Clarence, N.Y., assignor to Westinghouse Electric Corporation, Pittsburgh, Pa., a corporation of Pennsylvania
Filed Aug. 31, 1962, Ser. No. 220,658
1 Claim. (Cl. 308—127)

The present invention relates to electric motors, and more particularly to the bearing lubrication arrangements for electric motors.

There are many uses for electric motors that require exceedingly quiet motor operation. In order to obtain the so-called "superquiet" operation, the bearings and arrangements for lubricating the bearings must be carefully and specially arranged and devised. A continuous and relatively substantial flow of lubricant through the motor rotor bearings is essential to quiet operation. Also, it has been found that the arrangements for producing the flow of lubricant and for containing the flow to bearing areas must be specifically devised to not introduce noise in the operation of the motor.

It is a principal object of the present invention to provide an electric motor having improved bearing and lubrication arrangements to enable superquiet motor operation.

Another important object of the invention is to provide an improved electric motor having built-in arrangements for circulating and containing bearing lubricant in quantities sufficient to assure quiet operation under all expected conditions of service.

According to the invention, the electric motor, which is intended for generally horizontal rotor shaft operation, is provided with a lubricant sump adjacent to but beneath the axis of the rotor bearing to be lubricated. A viscosity pump comprising a rotating impeller secured to the motor rotor shaft and a stationary impeller shroud member carried by the motor frame is positioned to be partially submerged in the sump to pump lubricant from the sump to a discharge outlet above the axis of the motor rotor. Passageways in the motor frame are provided to convey the lubricant from the discharge outlet of the viscosity pump to the motor rotor bearing and from the rotor bearing to return to the sump. The impeller of the viscosity pump is provided only with a plane cylindrical peripheral surface so that the pump is essentially noiseless in operation and the lubricant is delivered with a minimum of undesirable turbulence and aeration. With the aforementioned arrangement of viscosity pump to assure a reliable flow of lubricant to the motor bearings at all times it is also possible to provide a simple trap type of lubricant seal for the motor rotor shaft that does not physically engage the rotating shaft and hence is practically noiseless in operation.

Further objects, features and the attending advantages of the invention will be apparent with reference to the following specification and drawings, in which.

Figure 1:
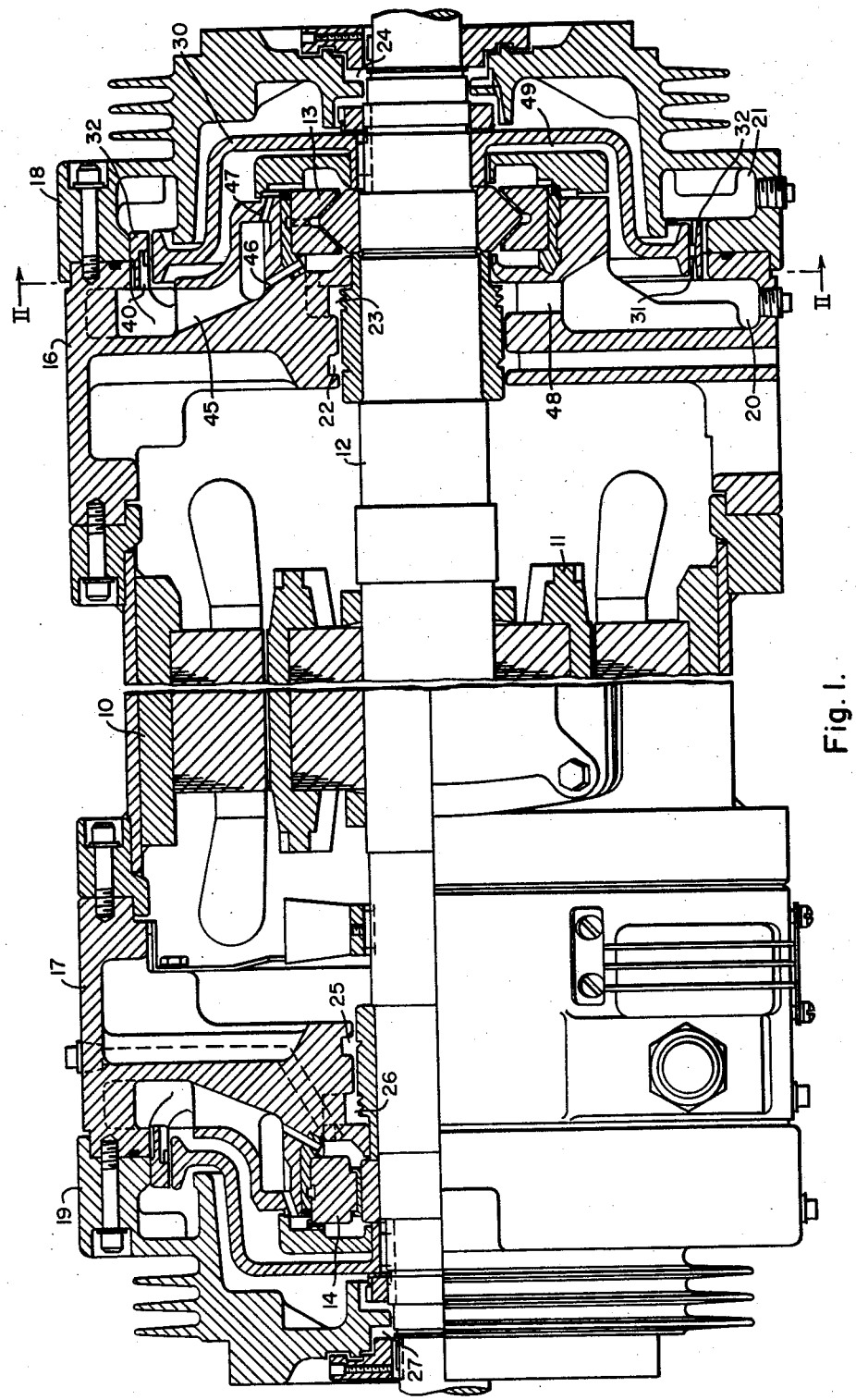
FIGURE 1 is an electric motor embodying the bearing lubrication arrangements of the invention.

Referring now to FIGURE 1 of the drawings an electric motor embodying the bearing and bearing lubrication arrangements of the invention will be briefly described. It is not believed necessary to described in detail the assembly of the electric motor since this invention is concerned primarily only with the bearing and bearing lubrication arrangements for the motor. The motor is comprised of a stator frame member 10 and a rotor member 11 secured to the motor rotor shaft 12. Bearings 13 and 14 are provided at opposite ends of the electric motor shaft 12. It should be pointed out that the electric motor of the invention is designed for generally horizontal shaft operation and incorporates lubricant sumps at the bottom of the motor housings to be later described in more detail. It will also be noted that the bearings 13 and 14 are different in detail from each other since in the particular motor being described such bearing arrangements were designed to provide for the necessary torque and thrust forces which are different at each end of the motor. Since the details of the bearings 13 and 14 are not essential to an understanding of the invention and such bearings may take various arrangements it should be understood that the invention is not limited to any particular detail of bearing structure.

Figure 2:
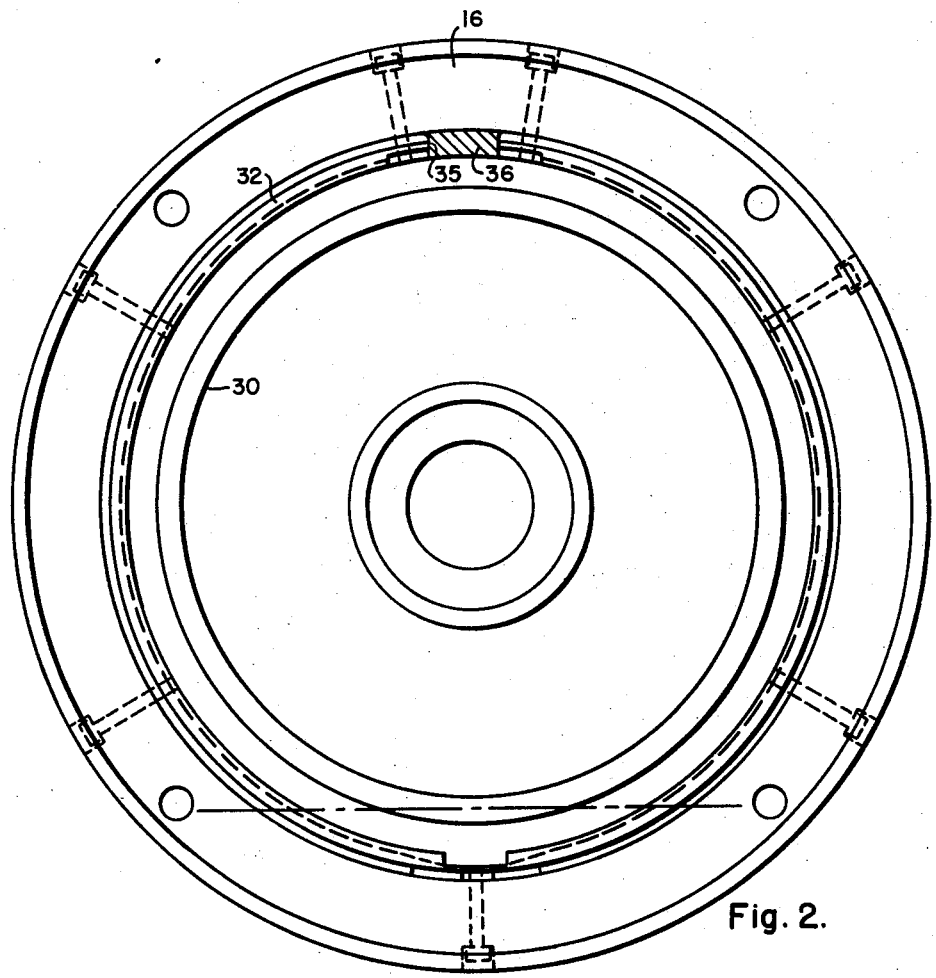
FIG. 2 is an elevational view on the line II—II taken in the direction of the arrows of FIG. 1 showing only the outer bracket and the shroud ring with the scraper projection of the inner bracket casting shown in section.
Figure 3:
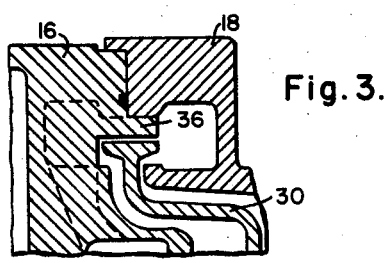
FIG. 3 is a fragmentary sectional view of the upper portion of the inner and outer bracket castings showing the arrangement of the scraper projection as it fits into the notch of the viscosity pump shroud ring.
Figure 4:
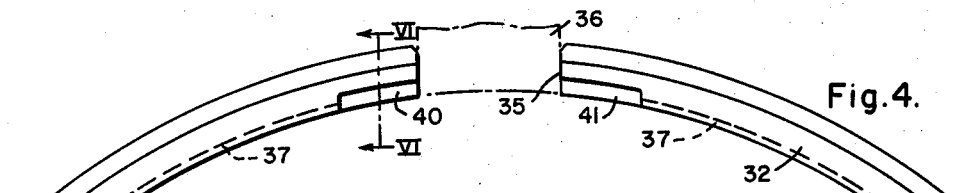
FIG. 4 is a fragmentary end elevation of the upper portion of the viscosity pump shroud ring.
Figure 5:
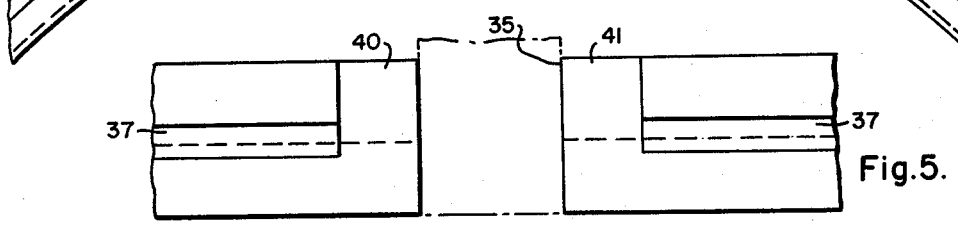
FIG. 5 is a plan view of the shroud ring as shown in FIG. 4 and seen from beneath.
Figure 6:
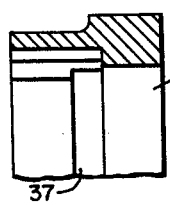
FIG. 6 is a cross section on the line VI—VI of FIG. 4.
Figure 9:
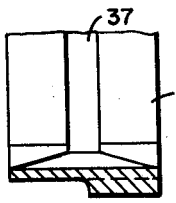
FIG. 9 is a section on the line IX—IX of FIG. 7.
Figure 8:
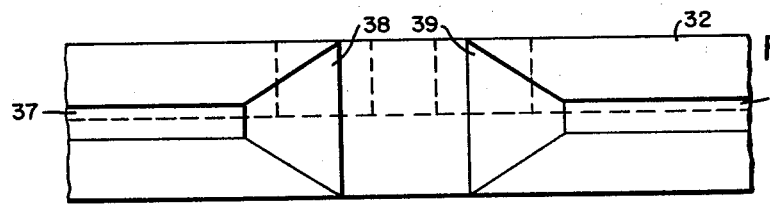
FIG. 8 is a detail plan view of FIG. 7 as seen from above.
Figure 7:
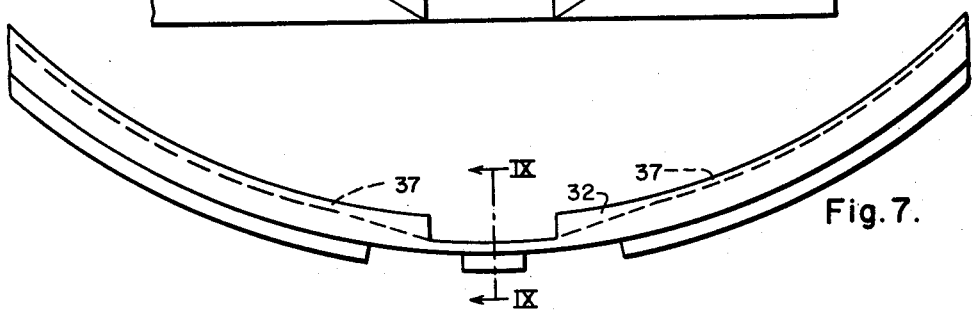
FIG. 7 is an end elevational view of the bottom portion of the viscosity pump shroud ring.

The respective bearings 13 and 14 are journaled in the inner bracket castings 16 and 17, respectively, which are bolted to the stator frame 10. Outer bracket castings 18 and 19 are bolted to the inner bracket castings 16 and 17, respectively, and the bracket castings 16–19 are shaped to provide oil sumps or reservoirs such as those shown at 20 and 21 for the bracket castings 16 and 18. The level of oil within the sumps 20 and 21 is indicated generally by the dashed ine (FIGS. 1 and 2).

The arrangement of oil sump, viscosity pump and lubricant passages for the respective bearings 13 and 14 are substantially identical and therefore only the details of the bearing lubrication system for bearing 13 will be described herein. Bearing seals of the oil trap type are indicated at 22–27 on either side of the sleeve bearing 13 and are comprised generally of tortuous or convoluted surfaces which serve to prevent axial flow of oil along the rotor shaft 12 and instead cause the oil to be trapped and flow downward to return to the respective oil sumps such as sumps 20 and 21.

A viscosity pump impeller member 30 is secured to the electric motor shaft 12 for rotation therewith. The periphery of the impeller member 30 is provided with a smooth cylindrical surface 31. A stationary shroud member 32 is positioned between the inner bracket casting 16 and the outer bracket casting 18, as shown, to closely surround the periphery 31 of the impeller 30. Reference may be made to FIGS. 2–9 of the drawings for a more detailed explanation of the formation of the stationary impeller shroud ring 32. The impeller shroud ring 32 is not a completely closed ring since it is open or notched at the top as indicated at 35 to receive the scraper member 36 which is a tongue projecting from the inner bracket casting 16 as shown most clearly in the details of FIGURES 2 and 3 of the drawings.

Referring now most particularly to FIGS. 4 through 9 of the drawings, the viscosity pump shroud ring 32 is provided with the groove 37 along its inner periphery within which the oil is constrained to move by viscosity pump interaction with the periphery of the rotating impeller member 30. The lower portion of the shroud ring 32, as shown in detail in FIGS. 7 and 8 of the drawings, is positioned beneath the oil level within the sumps 20 and 21 of FIG. 1 of the drawings. Inlet passageways 38 and 39 provide for the admission of oil to the peripheral groove 37 to be dragged by the impeller up to the top of the shroud ring in either direction depending upon the direction of the rotation of the rotor shaft 12. Upon reaching the upper portion of the stationary shroud ring 32 the oil in the groove 37 is moved against the scraper projection 36 and is thereby diverted to be discharged through either outlet 40 or 41 depending upon the direction of rotation of the electric motor rotor shaft 12.

Referring again to FIG. 1 of the drawing, the oil discharge from either the discharge outlet 40 or 41 (FIGS. 1 and 4) of the stationary shroud ring 32 is caused to flow through the passageway 45 to the drilled passages 46 and 47 to lubricate the bearing 13. The spent oil or lubricant from the bearing 13 may pass through the passageways 48 and 49 to return by gravity to the oil sumps 20 and 21. Thus, a continuous supply of oil under pressure is conveyed from the sumps 20 and 21 by the viscosity pump impeller 30 and shroud ring 32 to be discharged over the bearing 13. As previously mentioned the smooth peripheral surface 31 of the viscosity pump impeller 30 together with the grooved surface of the stationary shroud ring 32 function to provide a continuous steady flow of oil or lubricant with a minimum of aeration and turbulence. Such an arrangement assures that the operation of the motor will be essentially noiseless and there are no pumping noises to be added to the operation of the motor.

Although a specific arrangement of electric motor and bearings therefor has been described it should be understood that the bearing lubrication system of the invention may be used with other bearing arrangements so that various modifications which will occur to those skilled in the art are intended to be included in the scope of the appended claim.

I claim as my invention:

An electric motor comprising, a stator, a rotor shaft, at least one bearing member for rotatably supporting said shaft generally horizontally within said stator, a lubricant sump positioned below the axis of said shaft, a rotatable impeller having a smooth imperforate cylindrical periphery carried by said shaft for rotation therewith and with its lower periphery extending into said sump below the normal level of lubricant in the sump, a stationary shroud mounted to closely surround the periphery of said impeller and having a groove along its inner periphery facing the outer periphery of said impeller, an inlet passageway in said shroud connecting said groove to said sump beneath the normal level of lubricant therein, a stationary scraper member intersecting said groove and extending towards the periphery of said impeller above the axis of said shaft, a first outlet passageway connecting to said groove, a second outlet passageway connecting to said groove, said outlets being on the opposite sides of the scraper that are in planes generally parallel to the rotor axis, means to convey lubricant from said first and second outlet passageways to said bearing, and means to convey used lubricant from said bearing to said sump.

References Cited in the file of this patent

UNITED STATES PATENTS

| | | |
|---|---|---|
| 1,917,969 | Hague | July 11, 1933 |
| 2,551,973 | Schuck | May 8, 1951 |